(12) United States Patent
Doerr

(10) Patent No.: US 7,861,111 B2
(45) Date of Patent: Dec. 28, 2010

(54) SHARED DATA CENTER DISASTER RECOVERY SYSTEMS AND METHODS

(75) Inventor: Bryan Doerr, Ballwin, MO (US)

(73) Assignee: Savvis, Inc., Town & Country, MO (US)

( * ) Notice: Subject to any disclaimer, the term of this patent is extended or adjusted under 35 U.S.C. 154(b) by 657 days.

(21) Appl. No.: 11/818,674

(22) Filed: Jun. 15, 2007

(65) Prior Publication Data

US 2008/0313242 A1    Dec. 18, 2008

(51) Int. Cl.
  *G06F 11/00* (2006.01)
(52) U.S. Cl. .................................. 714/6; 714/2; 714/20
(58) Field of Classification Search ..................... 714/6, 714/20, 2
  See application file for complete search history.

(56) References Cited

U.S. PATENT DOCUMENTS

| | | | | |
|---|---|---|---|---|
| 5,560,005 | A * | 9/1996 | Hoover et al. ........................ | 1/1 |
| 5,566,297 | A * | 10/1996 | Devarakonda et al. ......... | 714/15 |
| 6,173,376 | B1 | 1/2001 | Fowler et al. | |
| 6,247,140 | B1 * | 6/2001 | Chase-Salerno et al. ........ | 714/2 |
| 6,654,783 | B1 * | 11/2003 | Hubbard ...................... | 709/202 |
| 6,697,960 | B1 * | 2/2004 | Clark et al. .................... | 714/15 |
| 6,711,594 | B2 * | 3/2004 | Yano et al. ........................... | 1/1 |
| 6,775,792 | B2 * | 8/2004 | Ulrich et al. .................... | 714/6 |
| 6,865,598 | B2 * | 3/2005 | Watkins et al. .............. | 709/216 |
| 6,928,580 | B2 * | 8/2005 | Pedone et al. ................... | 714/7 |
| 6,990,606 | B2 * | 1/2006 | Schroiff et al. ................. | 714/7 |
| 7,058,853 | B1 * | 6/2006 | Kavanappillil et al. ......... | 714/13 |
| 7,069,234 | B1 * | 6/2006 | Cornelius et al. ............. | 705/26 |
| 7,249,281 | B2 * | 7/2007 | Shirley et al. ................. | 714/15 |
| 7,472,241 | B2 * | 12/2008 | Uchiyama et al. ............ | 711/162 |
| 7,555,674 | B1 * | 6/2009 | Wang ........................... | 714/15 |
| 2003/0050937 | A1 * | 3/2003 | Lusen et al. .............. | 707/104.1 |
| 2003/0074342 | A1 * | 4/2003 | Curtis ........................... | 707/1 |
| 2004/0078397 | A1 * | 4/2004 | Mehta et al. ................. | 707/202 |
| 2004/0107381 | A1 * | 6/2004 | Bomfim et al. ................ | 714/4 |
| 2005/0021869 | A1 * | 1/2005 | Aultman et al. ............. | 709/249 |
| 2005/0182838 | A1 * | 8/2005 | Sheets et al. ................ | 709/226 |
| 2005/0267970 | A1 * | 12/2005 | Sugizaki ..................... | 709/225 |
| 2006/0005048 | A1 * | 1/2006 | Osaki et al. .................. | 713/193 |
| 2006/0149991 | A1 * | 7/2006 | Guzman et al. ............... | 714/2 |
| 2006/0212744 | A1 * | 9/2006 | Benner et al. .................. | 714/6 |
| 2006/0248295 | A1 * | 11/2006 | Uchiyama et al. ........... | 711/162 |
| 2007/0078982 | A1 * | 4/2007 | Aidun et al. ................. | 709/225 |
| 2007/0133406 | A1 * | 6/2007 | Vasseur ....................... | 370/230 |
| 2007/0165626 | A1 * | 7/2007 | Sultan et al. ................. | 370/389 |

OTHER PUBLICATIONS

International Search Report, PCT International Application No. PCT/US2008/67140, dated Sep. 17, 2008.

* cited by examiner

*Primary Examiner*—Scott T. Baderman
*Assistant Examiner*—Loan L. T. Truong
(74) *Attorney, Agent, or Firm*—Kenyon & Kenyon LLP

(57) ABSTRACT

Systems and methods for providing disaster recovery services to enterprise customers of virtual computing services are described. Disaster recovery services may be provided in data centers that also provide primary computing services to enterprise customers. Disaster recovery services may be distributed across the data centers, such that no dedicated disaster recovery site exists. In addition, disaster recovery services may be provided such that each of the enterprise customers receiving primary services at a given data center may be distributed across the remaining data centers for disaster recovery purposes.

30 Claims, 11 Drawing Sheets

SHARED DATA CENTER DISASTER RECOVERY SYSTEMS AND METHODS

BACKGROUND

The present invention generally relates to disaster recovery systems. Some example embodiments of the present invention are applicable to distributed virtual computing services provided to a plurality of customers.

The present invention generally relates to computing services, e.g., virtual computing services provided by a service provider to an enterprise customer, or to multiple enterprise customers. In some example embodiments, disaster recovery locations for these enterprise customers may be provided, and the disaster recovery locations for multiple enterprise customers may be distributed across multiple data centers that are also used to provide regular production services.

Service providers typically provide services, e.g., virtual computing services such as hosting or storage management, from a number of data centers. Each data center may contain servers, networking devices, storage systems, security systems, and all other hardware and software resources required to provide for the computing needs of the enterprise customers they serve. Each enterprise customer's services may be provided primarily by a particular data center, in the same manner as a company that manages its own computing infrastructure has a primary data center. However, multiple enterprise customers may share the same primary data center. Enterprise customers contract with the service providers to provide computing services for customer applications. The service providers then allocate the resources needed for each customer application in a data center. Service contracts may include guarantees of certain levels of system performance and availability (e.g., Service-Level agreements or SLAs).

To meet service availability targets, and to ensure service continuity in the event of a disaster, disaster recovery services may be provided. Examples of disasters include natural disasters, power failures, network failures, fires, and other events that impair the operation or use of a computing center. Consumers of virtual computing services typically require disaster recovery services able to ensure that critical applications remain functional in the event of a significant failure. Often these customers require disaster recovery services that are able to react to the failure of an entire data center. Therefore, service providers must allocate redundant systems and services in remote locations in order to implement the disaster recovery services expected.

An enterprise operating its own data center may have an entire dedicated backup data center set up to serve as a backup in the event of a disaster at its primary data center. The problem with his approach is that the resources spent on the backup are typically idle when the primary data center is operational. Thus, the overhead required for this approach is high, often 100% for many types of resources. Disaster recovery resources provided in this manner are inefficient, requiring unnecessary resources.

Alternatively, some service providers maintain a dedicated disaster recovery data center to serve the needs of multiple customers. In the typical case, a service provider would locate a data center at a location separate from its other production data centers. The service provider would then equip the data center with the hardware and other resources used to provide virtual computing services to its customers at other locations. This shared backup data center is still idle when not in use for disaster recovery. Moreover, when major disaster events occur, there may not be sufficient capacity to meet the disaster recovery needs of all the customers. Also, the central disaster recovery site may not be configured to provide an easy transition to operation when a disaster occurs. When multiple customers all lose service from a primary site at the same time from a common event it may be difficult to transition all of them to the backup site at the same time in an orderly fashion. Finally, while the disaster recovery services are provided remote from other data centers, the disaster recovery data center is itself becomes a single point of failure for a large group of customers. While a primary production site has failed, if the disaster recovery data center is unable to provide services for some reason, the services of all enterprise customers located in the failed primary production site will be affected.

There exists a need for a distributed disaster recovery system able to provide disaster recovery services to enterprise customers efficiently and reliably.

SUMMARY

In some example embodiments of the present invention, a system is provided for providing computing services including a disaster recovery capability for a plurality of computing service enterprise customers. The example system may include a plurality of physical locations, each having a plurality of hardware and software resources of a plurality of types and configured to provide virtual computing services to at least one of the plurality of enterprise customers. In the example system, each enterprise customer may have configuration data and transaction data located at a respective primary one of the physical locations that provides virtual computing services to the enterprise customer. In the example system, each enterprise customer may have mirrored transaction data and replicated configuration data stored at a respective secondary one of the physical locations so that the secondary location is configured to provide virtual computing services for the customer in response to the occurrence of a disaster event that prevents the virtual computing service for the enterprise customer from being provided by the enterprise customer's respective primary physical location. In the example system, for each set of enterprise customers with the same primary location, the corresponding secondary locations may be distributed across the plurality of physical locations.

In an example system each of the plurality of physical locations may have substantially less than 100% reserve capacity for disaster recovery.

In an example system, for N physical locations, each having approximately X capacity for primary computing services, each of the physical locations is provisioned with approximately $X/(N-1)$ additional reserve capacity for disaster recovery.

In an example system, the total amount of reserve capacity provided for disaster recovery may be approximately the same as or less than the capacity for primary computing services provided by the physical location that has the largest capacity for primary computing services.

In an example system, for each set of enterprise customers having a common primary and a common secondary physical location, the common secondary location may have sufficient reserve capacity to provide substantially all of the virtual computing services required by the set of enterprise customers.

In an example system, for each set of enterprise customers having a common primary and a common secondary physical location, the common secondary location may have sufficient reserve capacity to provide all of the services required by that set of enterprise customers.

In an example system, every enterprise customer may have a contracted level of disaster recovery service performance that is less than or equal to the enterprise customer's regular contracted level of service performance, and for every set of enterprise customers having a common primary and a common secondary physical location, the common secondary location may have sufficient reserve capacity to provide the contracted level of disaster recovery service performance for each enterprise customer in the set of enterprise customers.

An example system may also include a configuration replication engine configured to copy configuration data changes for the virtual computing service made for an enterprise customer at the enterprise customer's primary location to the secondary location.

In an example system, physical databases for an enterprise customer located at the primary location may be mirrored at the secondary location.

In an example system, transaction data stored in the physical databases may be mirrored synchronously at the secondary location.

In an example system, the computing services may include application services, wherein the application services may include one or more of online transaction processing, online analytics, and software as a service.

In an example system, the computing services may be provided by systems including one or more of client-server systems, web servers, 2-tiered web servers, 3-tiered web servers, and n-tiered web servers.

In an example system, the computing services may include IT infrastructure management services, including one or more of storage management, LAN management, computing management, and security management.

In an example system, the plurality of hardware and software resources provided at the plurality of physical locations may be the same type at each of the plurality of physical locations.

In an example system, the plurality of hardware and software resources provided at the plurality of physical locations may provide the same logical level interface for applications at each of the plurality of physical locations.

An example system may also include a data network connecting the plurality of physical locations and configured to transfer the configuration data and the transaction data between the plurality of physical locations.

In an example system, the data network may be configured to provide guaranteed quality of service levels.

In an example system, the data network may be configured to provide Managed OSI Layer 2 connections between locations.

In an example system, replication of configuration and transaction data may be provided at a lower guaranteed quality of service level than normal traffic.

An example method may be provided for allocating disaster recovery capabilities, for a plurality of computing services customers, among a plurality of physical locations. The example method may include identifying a primary physical location, having a plurality of hardware and software resources configured to provide virtual computing services to at least one of a plurality of enterprise customers, the primary location providing virtual computing services to an enterprise customer. The example method may include identifying all other physical locations capable of providing the virtual computing services to the enterprise customer. The example method may include choosing from among the physical locations capable of providing the virtual computing services to the enterprise customer, a secondary physical location at which to provision disaster recovery resources for the enterprise customer.

In an example method, the secondary physical location chosen may be the physical location with the least number of enterprise customers receiving disaster recovery services at the location.

In an example method, the secondary physical location chosen may be the physical location with the least number of enterprise customers receiving services at the location.

In an example method, the secondary physical location chosen may be the physical location with the least number of enterprise customers receiving disaster recovery services and able to meet the service levels contracted for by the enterprise customer.

In an example method, the secondary physical location chosen may be the physical location with the least number of enterprise customers receiving disaster recovery services and located beyond a geographical threshold from the primary location.

An example method may also be provided for providing disaster recovery for a plurality of computing service enterprise customers with a plurality of data centers. The example method may include assigning for each enterprise customer a primary location. The example method may include assigning for each enterprise customer a respective backup location separate from the enterprise customer's primary location, the enterprise customers sharing the same primary location having their backup locations distributed among the plurality of data centers so that the total backup capacity required at any backup location for all of the enterprise customer's from a particular primary location which are assigned to that backup location is substantially less than the capacity of the particular primary location. The example method may include for each enterprise customer, mirroring transaction data received at the enterprise customer's primary location to the enterprise customer's backup location. The example method may include for each enterprise customer, storing a copy of configuration changes to the enterprise customer's applications made at the enterprise customer's primary location to the enterprise customer's backup location. The example method may include, responsive to a failure of one of the plurality of data centers, for each enterprise customer which has the one of the plurality of data centers as their primary location, activating the enterprise customer's applications at the enterprise customer's backup location using the copied configuration data, and commencing backup operation for the enterprise customer at the backup location using the enterprise customer's applications and the mirrored transaction data. Further, in the example method, the backup operation may be commenced using a standard set of hardware. In the example method, back up operation may be commenced using a set of hardware providing the same logical level application interface. In the example method, the copy of configuration changes made to the enterprise customer's applications at the enterprise customer's primary location may be stored at the enterprise customer's backup location, through an automated process. In an example method, commencing the backup operation may include starting the customer's applications using the copied configuration data and the mirrored transaction data, and redirecting-application traffic from the primary location to the backup location. In the example method, the customer's application traffic may be redirected by altering domain name service routing tables.

DETAILED DESCRIPTION OF EXAMPLE EMBODIMENTS

Figure 1A:
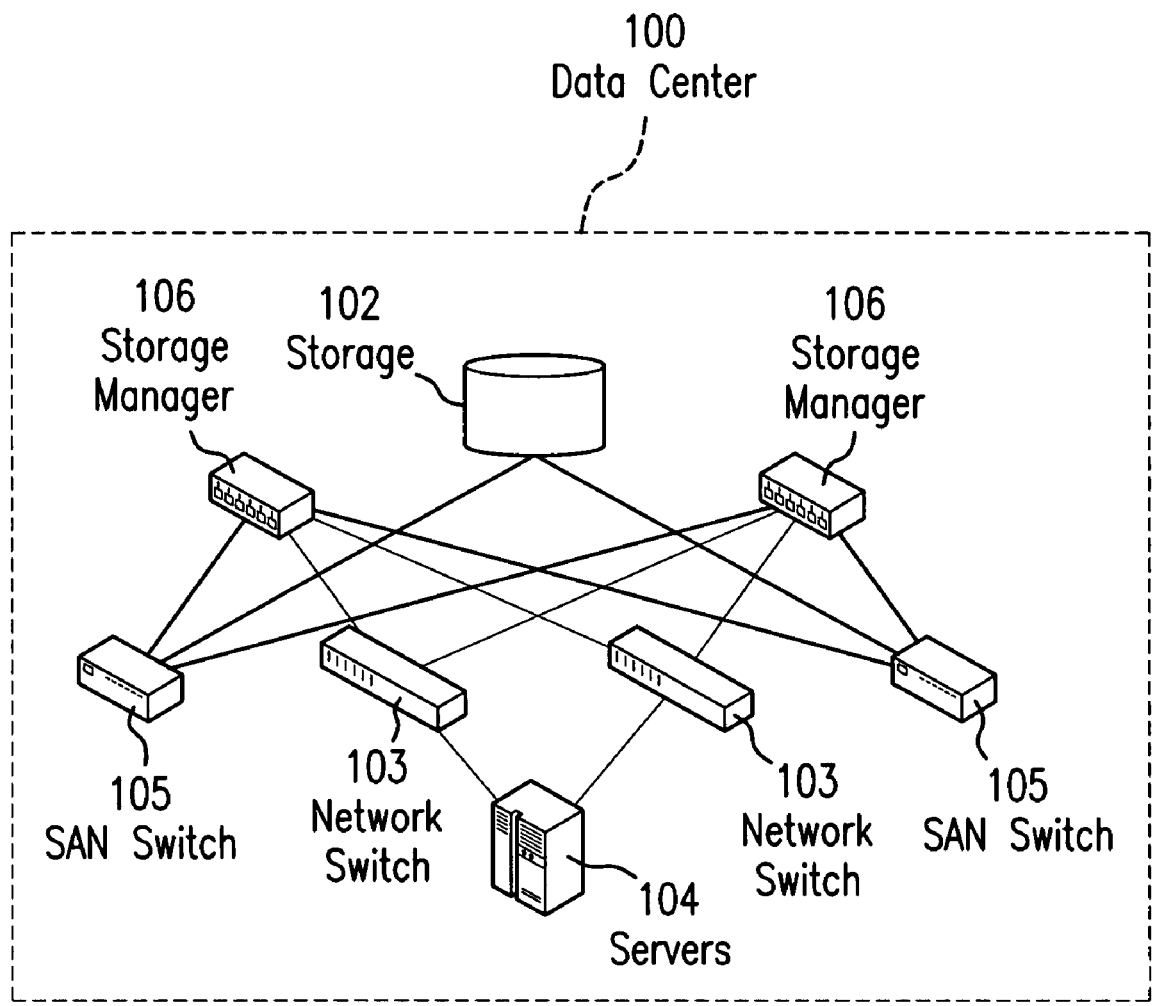
FIG. 1a illustrates an example data center.

Some example embodiments of the present invention include systems and methods for enabling disaster recovery for the enterprise customers of a service provider of computing services. The service provider may provide various types of computing services. These services may be provided in various forms. For example, application services may be provided, including, e.g., online transaction processing, online analytics, or software as a service applications. The computing services provided may be provided by a number of different types of systems including, e.g., client-server, web server, 2-tiered web server, 3-tiered web server, and n-tiered web server systems. In addition, the computing services may include IT management services, including, e.g., storage management, LAN management, computing management, and security management. These computing services may be provided to multiple customers using multiple data centers operated by the computing service provider.

The disaster recovery system may distribute disaster recovery services over a number of data centers operated by the service provider, which may also be used for primary services as opposed to being dedicated to disaster recovery. Enterprise customers may be assigned a data center location from which they receive their primary computing services. They may also be assigned a disaster recovery data center, with the assignments being made such that the set of customers assigned a particular common primary data center is distributed across the remaining data centers for disaster recover purposes. Thus, for a set of various customers which have the same primary data center, the respective disaster recovery sites are distributed across the multiple data centers, in a more or less balanced fashion. In some example embodiments, enterprise customers may receive primary data services from more than one data center. In such a case, an enterprise customer may receive primary data services for one set of applications from a data center and may also receive disaster recovery services from the same data center for a difference set of applications for which primary services are provided at a remote location.

The transaction data of each enterprise customer's applications may be mirrored at a disaster recovery data center. In addition, all configuration information for the customer's applications may be copied to the disaster recovery location. It will be appreciated, that this copying may occur responsive to any changes made to a customer's configuration, or changes may be batched and transferred periodically. In this way, when a failure occurs, the affected applications may be started at their respective disaster recovery locations based on the transaction data and the up to date configuration information.

Excess capacity and resources needed to provide disaster recovery services may be provided within each of the production data centers. Each production data center may be provisioned with more resources than required to handle the production services sited within the data center. These resources may be used to provide disaster recovery services for the services of enterprise customers located in different data centers.

Unlike in a centralized disaster recovery configuration with a single backup data center, customers from each production data center are not provided with disaster recovery services from the same secondary location. At each data center, a subset of the customers receive normal production data services from that data center. The backup services for that subset of customers is provided across the set of other available data centers, each data center providing backup services for only a part of the subset of customers from any other data center. In this way, when a disaster occurs at the production data center, the customers from that data center have their backup service initiated separately at a number of other data centers. Each other data center need only have a small subset of the capacity necessary to provide a complete backup for the failed data center.

Some example embodiments of the present invention may be able to provide disaster recovery services for numerous enterprise customers efficiently. First, there may be no need for a dedicated disaster recovery data center and, therefore, no need for staffing and other resources that would be required to operate a dedicated disaster recovery data center. Rather, only a small number of resources may need to be installed in each of the production data centers. Also, the time needed to commence disaster recovery operations may be reduced, because, at any given site being used to provide backup services, there are fewer backup customers whose services must be brought online at one time.

In addition, since the production services, associated with the enterprise customers, located at each site may not have corresponding disaster recovery services provided at a single site, but rather the disaster recovery services may be distributed across many data centers, the disaster recovery service itself may be more reliable. In the case of a failure of both a primary data center and a disaster recovery location, only a small number of customer applications may be out of service.

Some example embodiments of the present invention may provide disaster recovery services for enterprise customers of virtual computing service providers. Such a virtual computing service provider may maintain a number of data centers, each of which may provide virtual computing services for multiple enterprise customers. Although virtual computing services provided to multiple enterprise customers are a primary focus, it will be appreciated that the methods and systems described herein, may also be used in other contexts, for example for a single large enterprise operating multiple data centers to provide internal data services, or a virtual computing service providing services to small customers or individuals.

A virtual computing service provider may equip data centers, as illustrated in FIG. 1a. It should be understood that FIG. 1a merely illustrates an exemplary data center, and that different data center configurations having additional, fewer, or different elements may be used with example embodiments of the present invention. The service provider may provision the data centers with the hardware and software resources needed to provide virtual computing services to multiple enterprise customers. Such data centers are provided, for example, as part of Intelligent Hosting$^{SM}$ Services available from Savvis, Inc. of Town & Country, MO (the assignee of the present application). The service provider may allocate the storage necessary for each customers' applications and data and may maintain current configuration information for each application or service provided to an enterprise customer. The configuration information may include all the necessary settings and other information required for the virtual computing services to be provided. If a standard set of hardware is used, and customer's working data (e.g., transaction databases) are available, the configuration data may be use to re-boot a standard set of hardware to produce a duplicate of the computing services provided by the data center for an enterprise customer.

The data centers may be provisioned with, e.g., servers 104, 204, including blade servers and whiteboxes, which may provide computing capacity for customer applications. SANS may be provided, in order to supply enterprise customers with adequate storage 102, 202. The SANS may include all elements used in implementing a SAN including SAN network elements, such as SAN switches 105, 205. These SAN elements may communicate over various types of connections, e.g., Fibrechannel connections. Storage managers 106, 206, for example the IPStor storage manager by FalconStor, may also be provided to effectively supply storage to the enterprise customers. The storage managers 106, 206 may provide functionality including backup and mirroring capabilities.

Figure 1B:
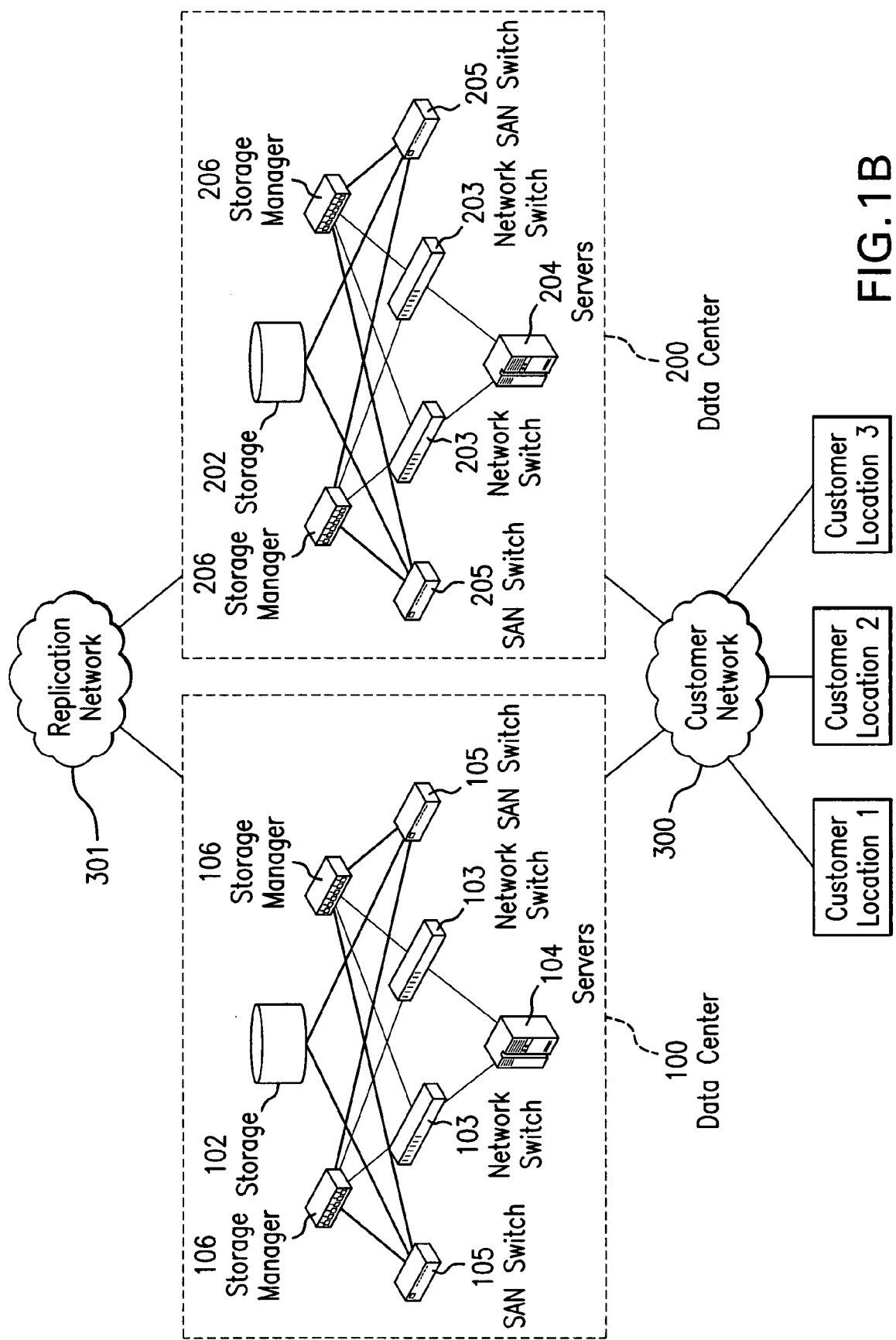
FIG. 1b illustrates two data centers of the type shown in FIG. 1a with both customer and replication networks provided.

Multiple data centers, e.g., data centers of the type discussed above in FIG. 1a, can be networked with each other and with customers as shown in FIG. 1b. For example, data centers may be interconnected by a data network 301 provided and maintained by the service provider, and which may be used to mirror transaction data and configuration data between data centers so that disaster recovery services may be provided. Each enterprise customer's transaction data and configuration information may be transferred between the primary data center serving that customer and the disaster recovery data center, over the network 301. Unlike in a typical disaster recovery system, enterprise customers may not need to provide a data network between the data centers in order to transfer transaction data and configuration information. In addition, the service provider may monitor the performance characteristics of the network infrastructure 301. The service provider may also enforce quality of service policies over the network infrastructure 301. In this way, the service provider may prioritize services using the network, ensuring that each service is provided with sufficient resources. The service provider may also contract or otherwise arrange with enterprise customers, the required level of service to be provided by the network 301 and may charge appropriately for the level of service provided.

The service provider may support a variety of replication methods for both the transaction data and the configuration data. These different methods may be chosen to suit the particular applications being supported. The service provider may provide resources for the different replication methods. For instance, as noted above, data may be replicated at a disaster recovery data center using a variety of methods, including asynchronous methods and synchronous methods. Such methods may not all require the same network performance. For example, asynchronous replication methods may not need to complete as quickly as synchronous methods and may therefore require fewer network resources. Thus the service provider may guarantee a lower quality of service for the less time sensitive methods.

The service provider may also provide networking services to carry the production traffic of the enterprise customers. In an example embodiment, the service provider may provide a network 300 which connects enterprise customer networks or locations to the primary data center. The service provider may also provide networking resources to connect the disaster recovery data center to the customer network 300. The service provider may also provide network resources 300 to connect the primary or secondary data centers, or the customer networks to a public network, including for example, the Internet. The network resources 300 may provide access to the computing services located at the primary data center. In the case of a failure, the network resources 300 may also provide access to the computing services located at the disaster recovery data center. The service provider may also provide quality of service controls on these networking resources. The quality of service controls may ensure that customer applications are effectively prioritized. The quality of service controls may prioritize resources both as between enterprise customers sharing common networking resources and also as between the applications of a single enterprise customer.

Since a disaster event may be expected to be an infrequent occurrence, enterprise customers may purchase fewer networking resources to support application traffic to the disaster recover data center. The service provider may then configure quality of service levels in such a manner that critical applications continue to perform adequately in the event of a failure, while less critical applications may experience reduced performance. The service provide may coordinate with the enterprise customers to ensure that service levels are configured appropriately to meet the needs of each enterprise customer. If a customer's data network traffic is provided using a burstable, "pay-to-use" contract, the customer's networks themselves need not be re-sized to accommodate recovery after a disaster. However, the service provider needs to appropriately size lower level network connections, so that sufficient capacity is available for the burstable contract customers when those customers' traffic is re-routed to the disaster recovery site.

Using the customer applications, data, and configuration information the service provider may provide virtual computing services for each of its enterprise customers. To do so, the service provider may provide and maintain adequate server resources to execute the applications of the enterprise customers. It may provide adequate storage for each customer's data and application requirements, and may maintain adequate network availability according to the demands of the applications.

The service provider may also provide disaster recovery services for each of the enterprise customers. From the perspective of a single customer at a single data center, the disaster recovery service may allow for virtual computing services to be provided at a data center remote from the data center providing primary computing services to the enterprise customer, in the case of a failure.

Figure 2:
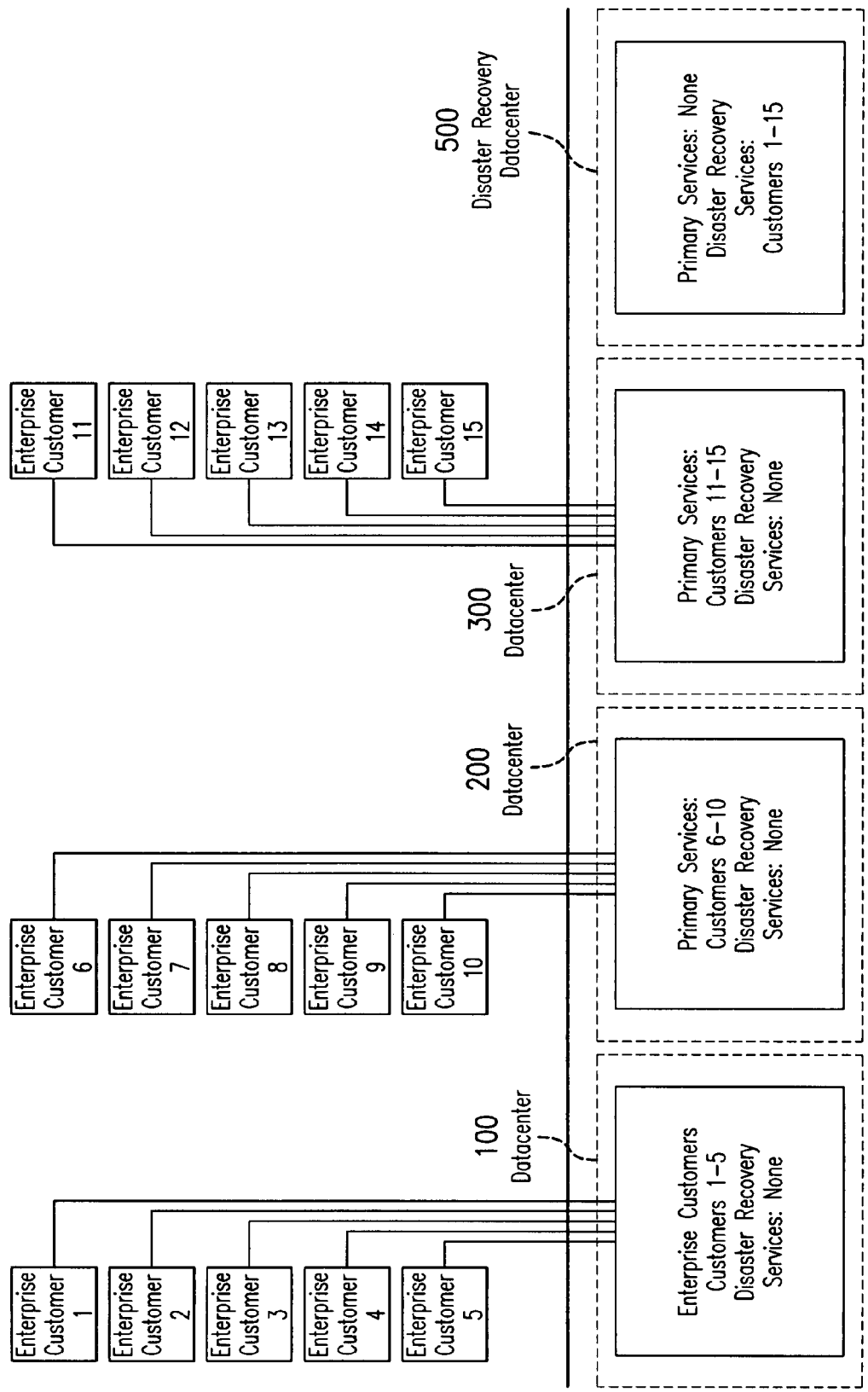
FIG. 2 illustrates a disaster recovery architecture.

A traditional disaster recovery architecture is shown in FIG. 2. Utilizing a traditional approach to disaster recovery, a service provider maintains a number of primary data centers 100, 200, 300. Those data centers 100, 200, 300 provide primary services to a number of customers. In addition to the data centers 100, 200, 300, the service provider also maintains a data center 500 dedicated to disaster recovery. At the disaster recovery data center 500, the service provider maintains infrastructure to provide for the customer applications at each of the primary data centers 100, 200, 300, in the case that a primary data center 100, 200, 300 fails. For each application that the enterprise customer wishes to receive disaster recovery services, the application data is mirrored at a data center, located remotely from the primary data center. As changes are made to the primary copy of application data, those changes are reflected in the application data stored in the remote data center. The changes may be affected through any means suitable, given the application, and may be made on a continuous basis or periodically. Although, ideally, adequate resources are provided at the backup location to allow for at least any other single data center failure, this requires the backup data center have idle capacity at least approximately as large as any of the other data centers, and to have all the necessary information (e.g., mirrored data and configuration information) for every customer in the system. This approach is rather inefficient. Although configuration and transaction data need not be kept "live" for every customer, if it is not, the time needed to bring the backup on-line in the event of a disaster is greatly increased. In some cases, the backup site merely contains unconfigured hardware resources of various types and a new computing center is assembled from scratch using backup data from the failed data center. This approach, while much less expensive, can easily result in long outages in the event of a disaster.

In one example embodiment, a disaster recovery system is provided that, in addition to the application data, the software on which the application is based may also be stored at the remote data center, as may all other elements of the configuration. When changes are made to the application itself in the primary site, those changes may be automatically made in the remote data center as well. Preferably such changes are made through an automated system which ensures that an exact copy of all application and all configuration information is provided. Alternatively application and configuration changes may be made through a system which identifies changes made to the primary configuration and notifies administrators that identical changes need to be made at the disaster recovery location. In an example embodiment, both an automated update process as well as a manual process may be used in coordination. In an example embodiment, replication of configuration data may be facilitated by a replication engine. The replication engine may be a system configured to monitor changes made to the configuration data. The replication engine may be further configured to ensure that when changes are made to the configuration data, those changes are mirrored in the data stored at the disaster recovery data center. To this end the replication engine may be designed to copy the configuration data in its entirety or parts of the configuration data from the primary data center to the disaster recovery data center. How the data is replicated may depend on the type of disaster recovery provided as well as the distance between the primary data center and the backup. If the primary and backup are relatively close, so that the time needed to copy configuration changes to the backup have a relatively low latency time, changes to the configuration data may be copied synchronously with the making of configuration changes on the primary data center. If distances are relatively large, or latency requirements stringent, configuration changes may be batched or copied asynchronously.

In the example embodiment, if the primary location fails, the application at the disaster recovery site may be loaded, as all application data is current with the primary application. In addition, the configuration and software is also current with the primary application. Therefore, the application traffic may be readily redirected to the disaster recovery location without a significant loss of service.

Figure 3:
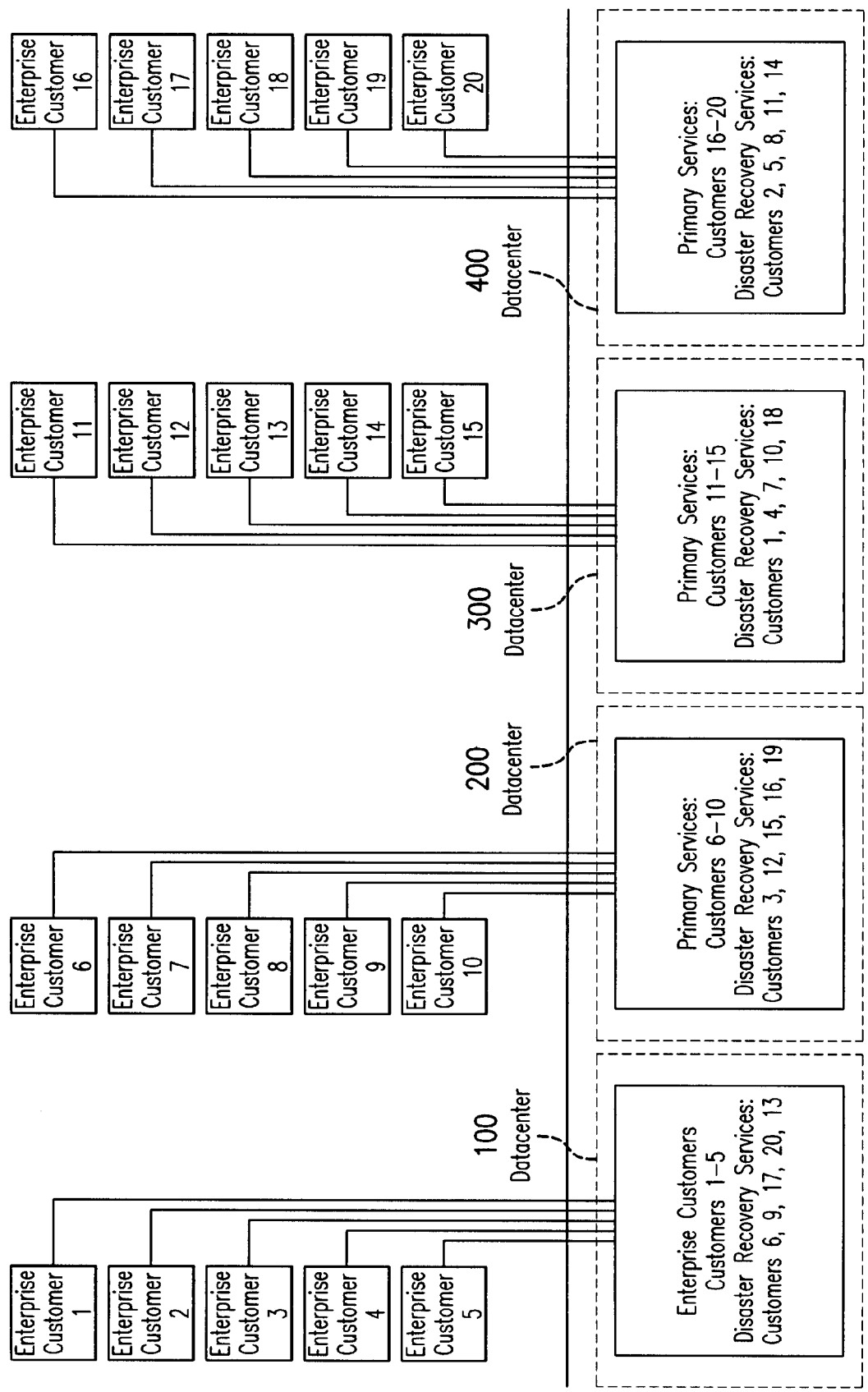
FIG. 3 illustrates an example system for disaster recovery, showing the assignment of disaster recovery services, according to an example embodiment of the present invention.

In the example embodiment, each data center that the service provider maintains may serve as a disaster recovery location for other data centers. In this embodiment each customer with an application hosted in a primary data center may have a disaster recovery data center assigned, as illustrated in FIG. 3. Enterprise customers with applications at a specific data center may not all be provided disaster recovery services out of the same remote data center. Rather disaster recovery services may be provided out of all of the remaining data centers.

FIG. 3 illustrates an example configuration with twenty enterprise customers receiving computing services from four different data centers 100, 200, 300, 400. As shown the enterprise customers may be distributed across the data centers 100, 200, 300, 400 for the purposes of receiving primary services. A dedicated disaster recovery data center may not be provided. Rather, each of the data centers 100, 200, 300, 400 may provide disaster recovery services.

Each of the enterprise customers receiving primary services from a particular data center may receive disaster recovery services from any of the remaining data centers. In an example embodiment, the disaster recovery services, for each enterprise customer with services being provided out of the same primary data center, may be provided such that the number of such customers with disaster recovery services provided from the same data center is a minimum. In FIG. 3, for example, the primary customers of each data center 100, 200, 300, 400 are distributed across all of the remaining data centers for disaster recovery purposes. For example the enterprise customers receiving primary services from data center 100, i.e. Enterprise Customers 1-5, may not receive disaster recovery services from a single data center. As depicted in FIG. 3, the disaster recovery services for each of the Enterprise Customers 1-5 may be allocated to any one of the remaining data centers, 200, 300, 400. The different locations may be in widely separated locations, for example in different cities, states, or countries, or may be more narrowly separated locations, as for example in different rooms of the same building with partitions that prevent the spread of fire and separate power supplies. The goal of the different locations is not physical separation for its own sake, but separation in order to minimize the chance that a disruption such as a fire or power failure will effect more than one location. For this reason it is understood that wide separation is generally desirable to protect, for example, against natural disasters or other events that may impact many square miles, but many advantages of the present invention may still be achieved at lower cost by lesser degrees of separation.

Although in the example described above, the enterprise customers primary and backup data sites are evenly distributed across the multiple locations, it will be appreciated that such duplication need not be exact, as long as sufficient spare capacity is provided at each location to provide the guaranteed level of service necessary for the customers using that site as a primary location, as well as the guaranteed level of backup service necessary for the customers using that site as a backup location. Moreover, it will be appreciated that customers may not require exact duplication of their primary data site, and may be tolerant of reduced or partially degraded service levels in the event of a disaster that disables their primary data center. For example, only business critical services might be replicated at their normal level of performance, while less critical services might be disabled, or provided at a lower level of performance.

Figure 5:
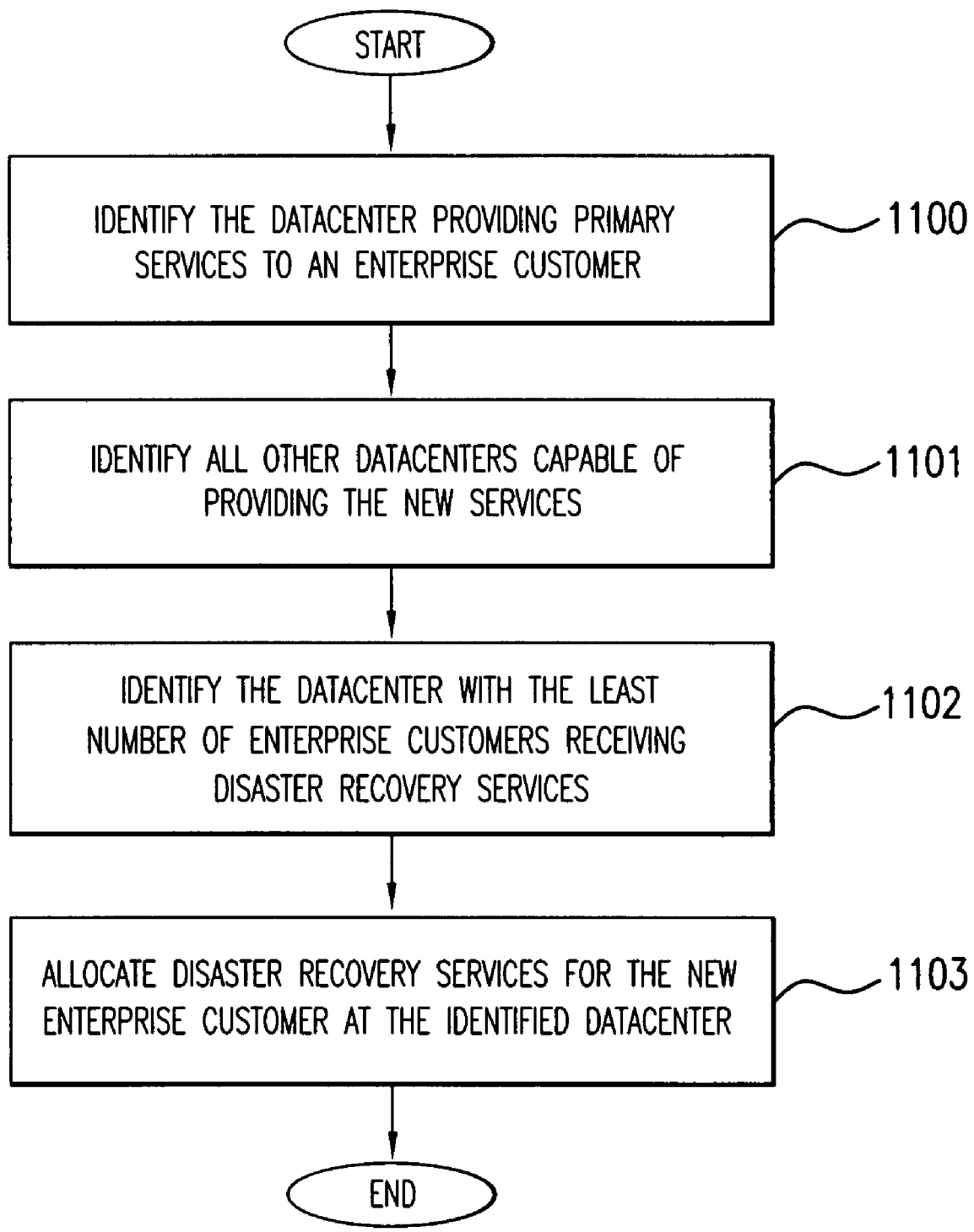
FIGS. 5-9 illustrate block diagrams of different example procedures for allocating disaster recovery services, according to an example embodiment of the present invention.

FIG. 5 depicts a method for allocating disaster recovery services for a new enterprise customer at a primary data center. In an example embodiment, when an existing customer wishes to obtain disaster recovery services, the data center providing primary services to that enterprise customer may be identified 1100. Next, the set of all other data centers capable of providing the required disaster recovery services may be identified 1101. From that set, the data center having the least number of enterprise customers receiving disaster recovery services may be identified 1102 and the new disaster recovery services may be allocated 1103.

In another embodiment, each enterprise customer may be allocated a disaster recovery location based on the total number of services provided at each remote location.

Figure 6:
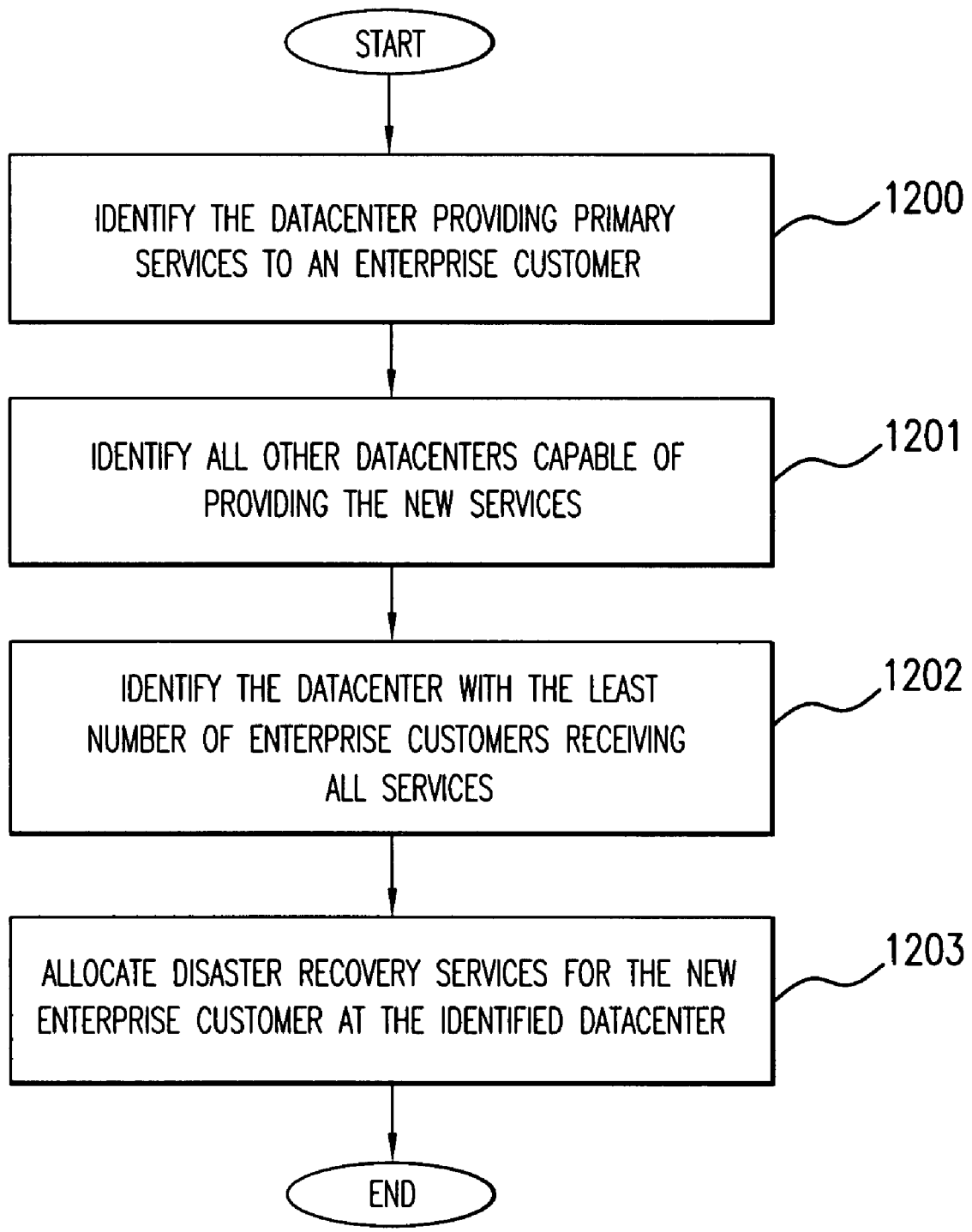

In this embodiment, depicted in FIG. 6, the first steps in locating new disaster recovery services may again include identifying the data centers remote from the primary data center, capable of providing the disaster recovery services 1201. Next, a data center may be identified which serves the least number of total enterprise customers, both for primary and disaster recovery services 1202, after which disaster recovery services may be allocated 1203. In this way the total services handled by each data center may be kept to a minimum.

In another example embodiment, the assignment of a disaster recovery data center may also be based on the service level agreements that may have been contracted for by the enterprise customer. Enterprise customers, in obtaining virtual computing services, may contract for a minimum guaranteed level of service. These contracts are known as Service Level Agreements (SLAs) and may apply to both the primary services and to disaster recovery services. The level of service contracted for may be different for a primary service and for its corresponding disaster recovery service. For example, since an application will typically spend little time running from the disaster recovery site, the service levels contracted for the disaster recovery service may be less than those contracted for the primary service. As used herein, "customer" has a primary meaning of an entity (such as a business) that is a recipient of services from a vendor in a commercial relationship, but is also understood to mean a recipient of services from a department under the same corporate umbrella, as for example when a large corporation has a computer services department that provides services to the corporation's various business units. "Customer" may also refer to the recipient of services in a hybrid situation, as when services are provided both by a department that is under the same corporate umbrella and by an outside vendor. Similarly, references to contracts or agreements for levels of service or the like have a primary meaning of commercial agreements between a customer and vendor, but are also understood to mean standards, protocols, or agreements between divisions or entities under the same corporate umbrella as well as hybrid situations to the extent applicable.

Figure 7:
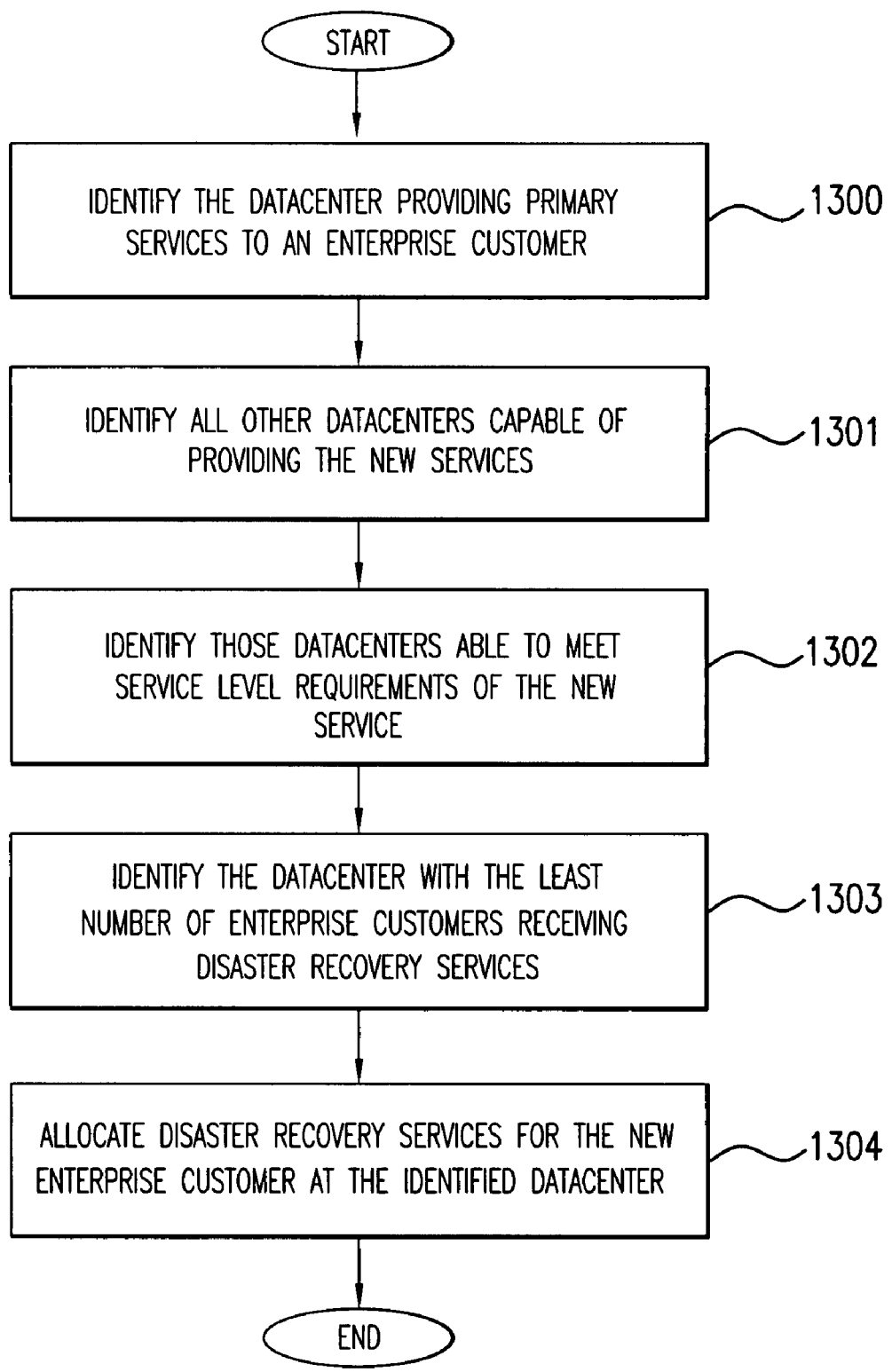

FIG. 7 depicts an example embodiment which accounts for SLAs when provisioning new disaster recovery services. As in the above examples, the data centers remote from the primary data center and capable of providing the services may be identified 1301. After which, those data centers able to meet the SLA agreements applicable to the new service may be identified 1302. From those data centers identified, those data centers with the least number of customers receiving disaster recovery services may be identified 1303 and disaster recovery services may be allocated 1304.

Figure 8:
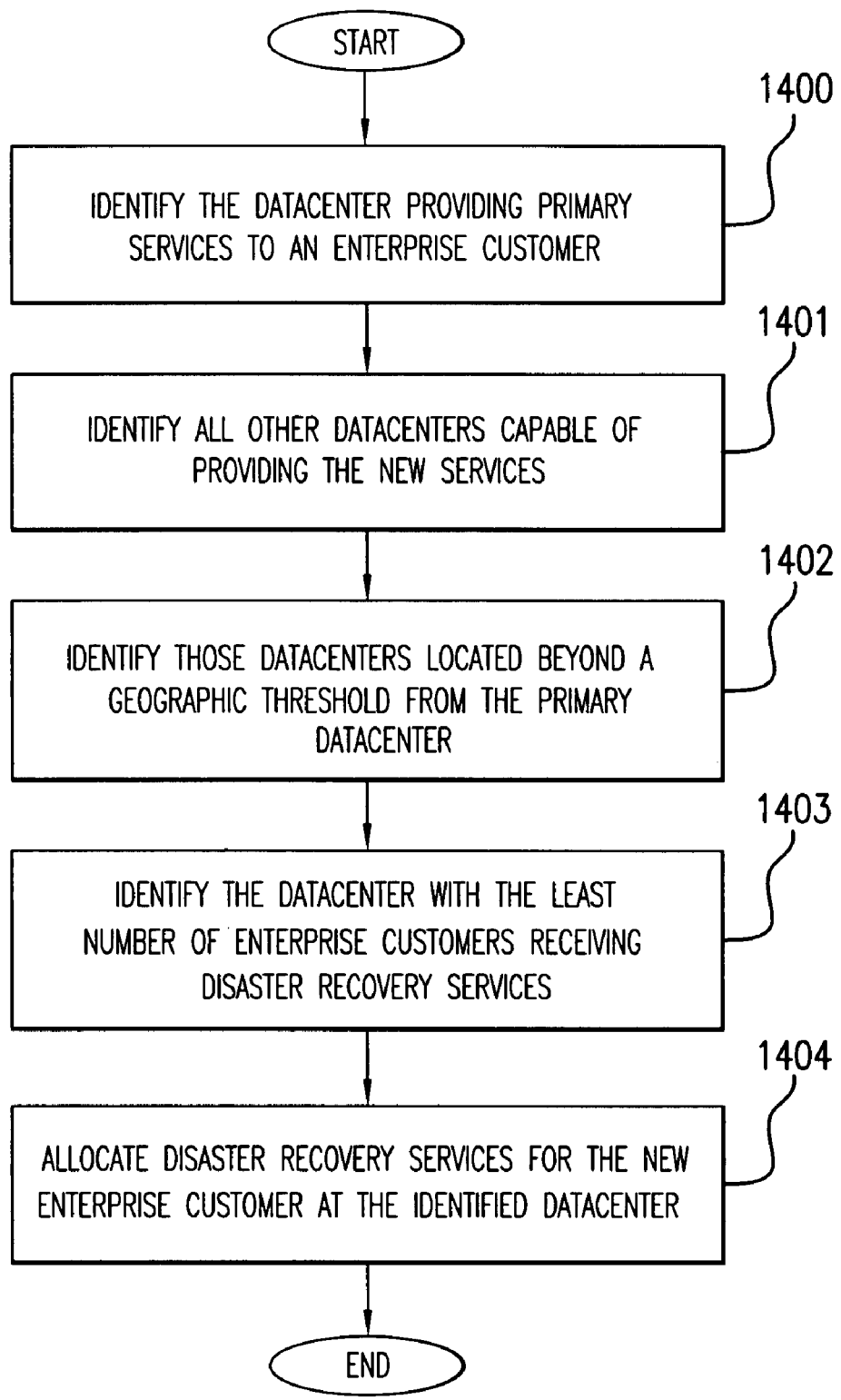

In another example embodiment of the present invention, each customer may be allocated a disaster recovery location based on both the number of other customers receiving disaster recovery services from the location and based on a geographic threshold, as shown in FIG. 8. In this example, it is recognized that some of the issues that could affect a data center may affect a larger geographic area, e.g., a hurricane. Therefore, when allocating disaster recovery services, the geographic region of the primary site may be taken into account. Again the first steps in identifying a disaster recovery data center may include identifying all of the remote data centers able to provide disaster recovery services, 1401. After which all of those data centers identified which are located beyond some geographic threshold from the primary data center may be identified 1402. This threshold may be quantitative, such as, for example, beyond 100 miles, or the threshold may be qualitative, such as requiring that disaster recovery sites be located outside of an earthquake region that the primary site happens to be located in. From those identified sites, a data center may be chosen which provides disaster recovery services to the fewest number of enterprise customers 1403 and the disaster recovery services may be allocated 1404.

Figure 9:
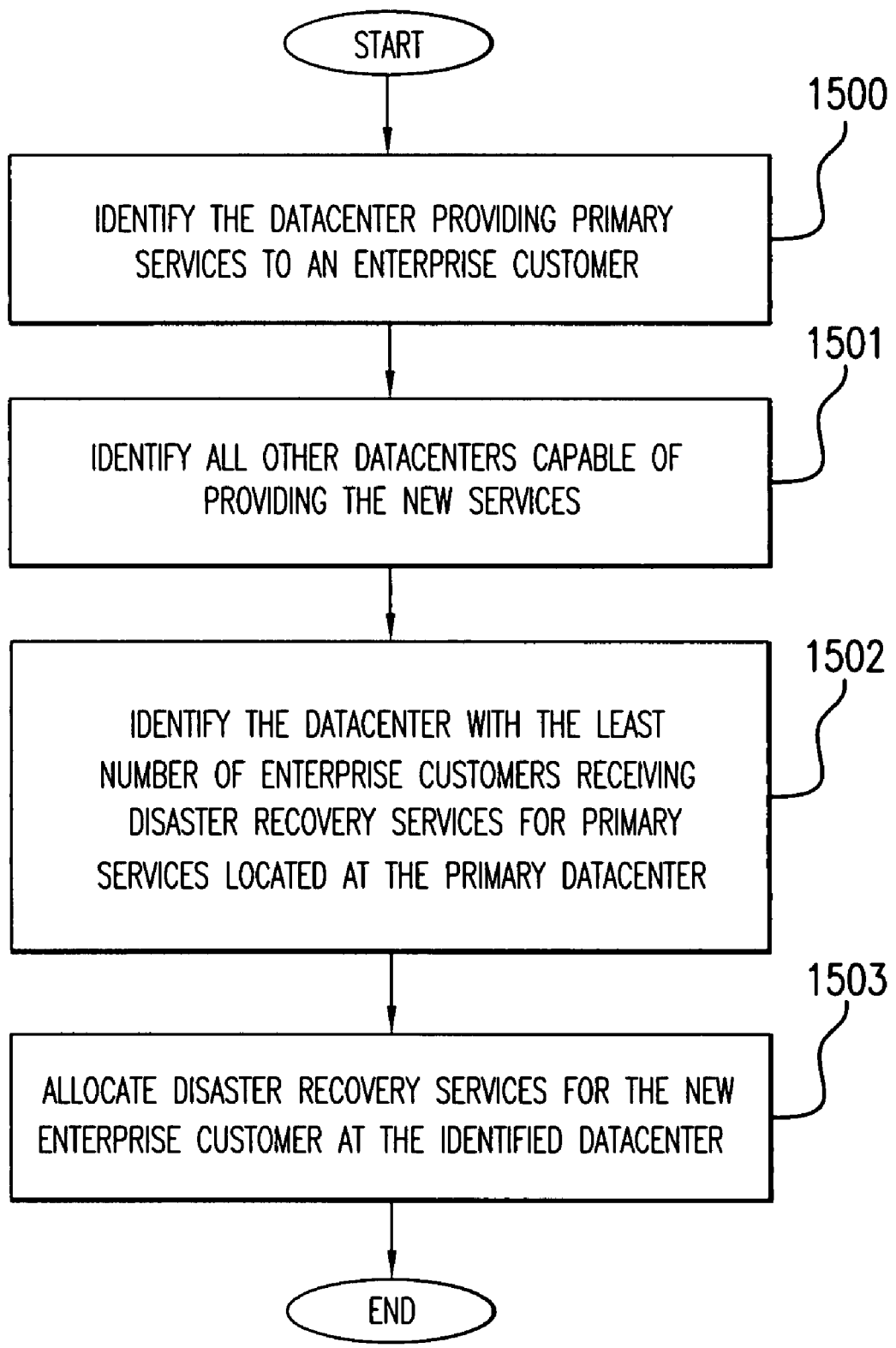

In yet another example embodiment, allocation may be based on the number of enterprise customers receiving primary services from a common data center, as illustrated in FIG. 9. Again, the first steps may include identifying those data centers, remote from the customer's primary data center, which are capable of providing the disaster recovery service 1501. Then those data centers may be identified which currently provide disaster recovery services for the least number of enterprise customers receiving primary services from the same data center as the customer for which disaster recovery services are being provisioned 1502, after which the new services may be allocated 1503.

As illustrated by the forgoing examples, each data center may be provisioned with only a relatively small amount of resources to provide disaster recovery services. For example, in a situation where each of N data centers has approximately the same capacity for primary services, and where individual customer's required capacity is relatively small compared to the size of the data centers, each data center may need to have only a relatively small amount of extra capacity, e.g., approximately an additional 1/N fraction of excess capacity for disaster recovery applications needs to be provided at each location. It will be appreciated that this number may vary somewhat, as resources may not be provisioned exactly uniformly and other considerations may affect the actual provisioning of disaster recovery capacity. For example, if one customer is significantly larger than other customers in terms of the capacity used by its applications, additional disaster recovery capacity may need to be allocated based on that customer's capacity requirements at the data center which provides backup services for that customer. It will also be appreciated, that less spare capacity may be required than indicated above, if customers are willing to except performance degradation when a disaster occurs.

Figure 4:
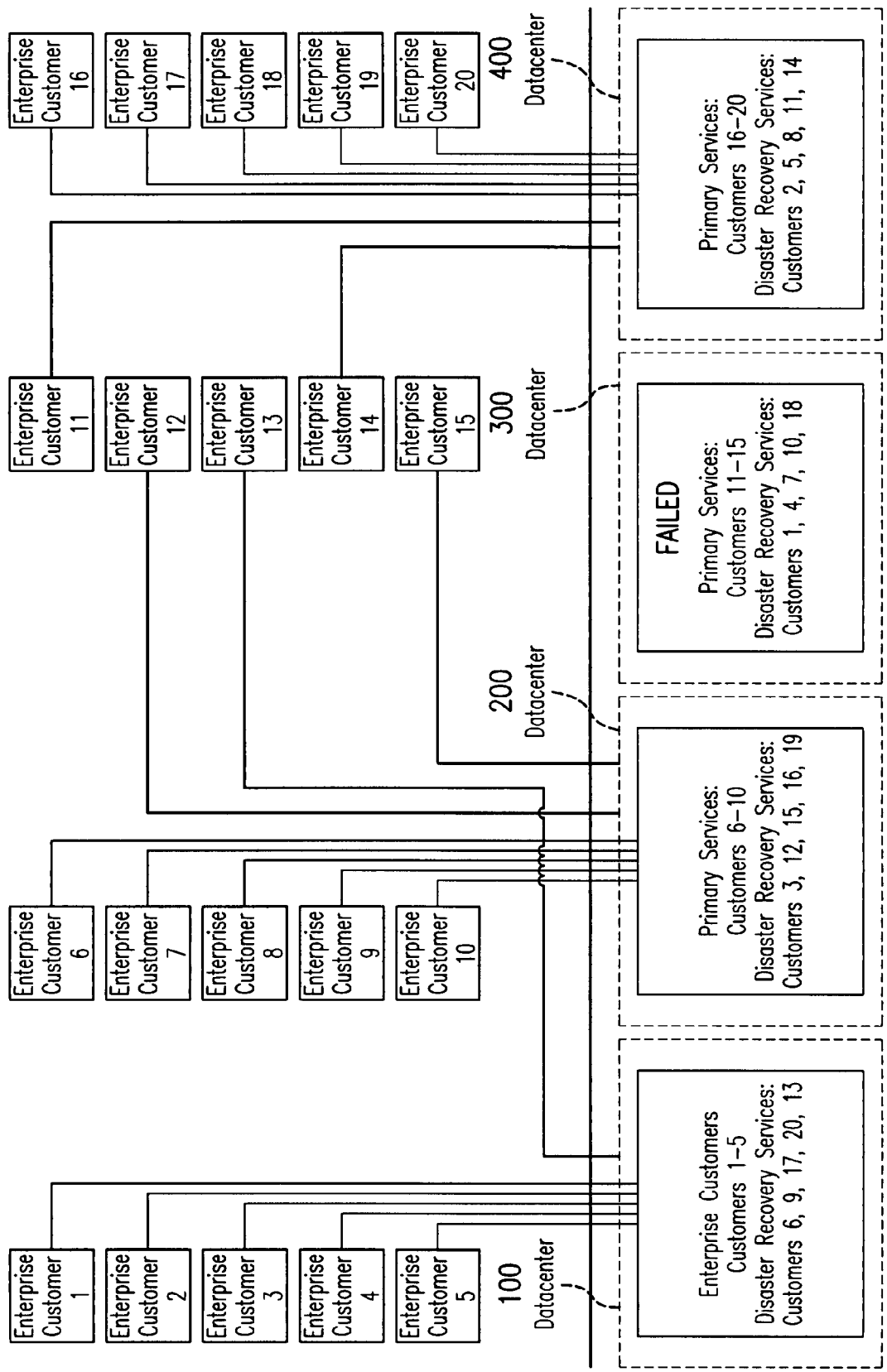
FIG. 4 illustrates the example system for disaster recovery, showing the failure of a data center according to an example embodiment of the present invention.

In example embodiments, when a primary site failure occurs, as depicted in FIG. 4, the primary services running at the failed data center may be relocated to the various disaster recovery data centers. FIG. 4 illustrates twenty customers receiving computing services from four separate data centers 100, 200, 300, 400. Should a data center fail, for example data center 300, the enterprise customers receiving primary services from that data center 300, may receive disaster recovery services from the remaining data centers 100, 200, 400. As illustrated in FIG. 4, no one data center provides disaster recovery services for all of the enterprise customers receiving services from the failed data center 300. Rather, disaster recovery services are distributed across the remaining data centers 100, 200, 400. Thus the amount of spare capacity required at any one data center is substantially reduced. Moreover, if load shedding of non-critical applications or slight degradation of quality of service is allowed after a disaster event, the amount of spare capacity that is required may be reduced. It will be appreciated that conventional capacity planning algorithms used to size the resources in each data center, need to be modified so that the data center has adequate capacity to provide the required QOS levels in the event of any of the other data centers failing. This can be accomplished by considering each possible data center failure, the resultant redistribution of customers, and the required capacity needed to meet the SLAs for those customers, as constraints in the capacity planning process for the data center.

As illustrated in the FIG. 4, only a small number of disaster recovery services need to be started at each functioning data center. Since customers receiving primary computing services at each of the data centers 100, 200, 300, 400 may be distributed across the other data centers for disaster recovery purposes, each data center 100, 200, 300, 400 may incur only a small additional load in the case of a primary data center failure. In addition, since the disaster recovery services may be distributed, in the case that a data center actively providing disaster recovery services for a failed site itself fails, only a small number of applications may be detrimentally affected, a significant benefit from the centralized disaster recovery model.

Figure 10:
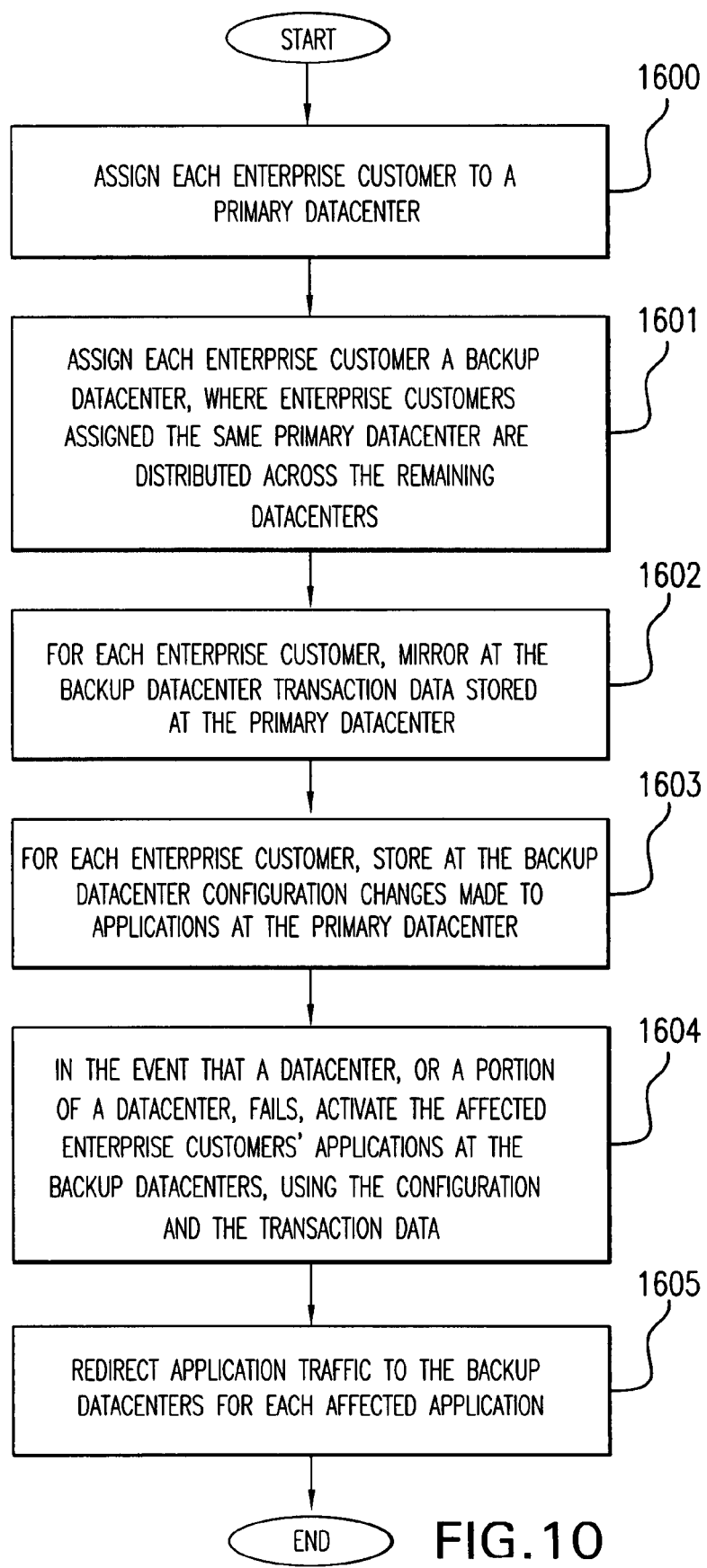
FIG. 10 illustrates a block diagram of an example procedure for providing disaster recovery services, according to an example embodiment of the present invention.

According to some example embodiments, disaster recovery services are provided if a data center, or a portion of a data center fails. For example, FIG. 10 illustrates an example procedure through which disaster recovery services may be provided. Initially, a data center location may be assigned to each enterprise customer for primary applications, 1600. In addition, each enterprise customer may be assigned a location for a disaster recovery data center 1601, for example, according to the procedures explained above. During normal operation, transaction data stored at the primary data centers may be mirrored at the disaster recovery data centers for each enterprise customer 1602. Mirroring of transaction data may be accomplished in any way suitable to the application. For instance, mirroring may be accomplished through use of a transaction based mirroring system. In this way it may be ensured that in the case of an outage, each application may be started at the disaster recovery location without first updating the transaction data or risking inconsistencies in the data used. During normal operation, configuration data for each application may also be copied to the disaster recovery data centers 1603. The configuration data may again be copied to the disaster recover data center in any manner suitable. In a system where the backup system is not too distant, or latency requirements are relatively lax, all mirroring of data may be done synchronously as transactions are completed. Mirroring may also be accomplished by way of batch updates, etc. Particularly, if latency requirements for transactions are relatively stringent and/or the backup data center is distant, the mirroring may be accomplished asynchronously. So as not to affect normal customer traffic, it may be advantageous to provide separate IP network routing planes which may be dedicated to data replication.

Should a data center, or a portion of a data center fail, disaster recovery services may be provided to maintain services for each of the affected applications. When a data center fails, the applications of each enterprise customer affected may be started at the disaster recovery locations 1604. These applications may be distributed across a number of data centers. Therefore, disaster recovery services may be provided from multiple data centers in the event a single data center fails. Starting the applications at the disaster recovery locations, may be accomplished easily as all of the information required to provide the affected services is already at the disaster recovery data center. The hardware at the backup location may be identical, or if different may provide the same logical level interface. For example, although different storage hardware may be provided, the storage management system may be provided with the same type of frame management system. Therefore, each application may be started on hardware at the disaster recovery location simply by loading the application based on the copied configuration information, and providing access to the mirrored transaction data. Since the configuration for each application may be updated at the corresponding disaster recovery data center as updates are made to the primary configuration, switchover to a disaster recovery location may be accomplished quickly. It is also possible that an application will not need to be started at the disaster recovery data center, as the application may be kept running in a "live" state at all times. In this case, the disaster recovery data center may be immediately able to provide disaster recovery services in the case of an outage.

Once an application is running at a disaster recovery location production traffic may be redirected to the disaster recovery application 1605. This may be accomplished trough a number of possible ways, for example changing a domain name service (DNS) table entry, or making a configuration change to another application.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A method of providing disaster recovery for a plurality of computing service enterprise customers with a plurality of data centers, comprising:

providing for each enterprise customer a primary location;

providing for each enterprise customer a respective backup location separate from the enterprise customer's primary location, wherein those enterprise customers that share the same primary location have their respective backup locations distributed among the plurality of data centers so that the total backup capacity required at any backup location for all of the enterprise customer's from a particular primary location that are assigned to that backup location is substantially less than the capacity of the particular primary location;

for each enterprise customer, mirroring transaction data received at the enterprise customer's primary location to the enterprise customer's backup location;

for each enterprise customer, storing a copy of configuration changes to the enterprise customer's applications made at the enterprise customer's primary location to the enterprise customer's backup location; and responsive to a failure of one of the plurality of data centers, for each enterprise customer that has the one of the plurality of data centers as their primary location, activating the enterprise customer's applications at the enterprise customer's backup location using the copied configuration data, and commencing backup operation for the enterprise customer at the backup location using the enterprise customer's applications and the mirrored transaction data.

2. The method of claim 1, wherein backup operation is commenced using a standard set of hardware.

3. The method of claim 1, wherein back up operation is commenced using a set of hardware providing the same logical level application interface.

4. The method of claim 1, wherein the copy of configuration changes made to the enterprise customer's applications at the enterprise customer's primary location is stored at the enterprise customer's backup location, through an automated process.

5. The method of claim 1, wherein commencing the backup operation comprises the steps of:

starting the customer's applications using the copied configuration data and the mirrored transaction data; and redirecting the customer's application traffic from the primary location to the backup location.

6. The method of claim 5, wherein the customer's application traffic is redirected by altering domain name service routing tables.

7. A system for providing computing services including a disaster recovery capability for a plurality of computing service enterprise customers, comprising:

a plurality of data centers provided at different physical locations, each having a plurality of hardware and software resources and configured to provide primary computing services to the enterprise customers based on each customer's configuration and transaction data;

wherein each enterprise customer is assigned to one of the data centers as a primary data center, the primary data center storing the respective customer's configuration and transaction data and providing computing services to the respective customer therefrom;

wherein each enterprise customer is assigned to one of the data centers as a secondary data center, which stores mirrored transaction data and replicated configuration data from which to provide computing services for the respective customer in response to a failure event at the customer's primary data center; and wherein, for each data center, the customers assigned to the respective data center as a primary data center each have a secondary data center assignment at another data center, wherein the secondary data center assignments are distributed across the remaining data centers.

8. The system of claim 7, wherein transaction data includes data stored and accessed by the respective customer, and configuration data includes data defining virtual computing services provided to the respective customer.

9. The system of claim 7, wherein each data center provides primary services to a set of enterprise customers and secondary services to another set of enterprise customers, different from and smaller than the first set.

10. The system of claim 7, wherein each particular data center includes a set of shared resources for providing virtual computing services, and the set of shared resources is used to provide primary services to those enterprise customers assigned to the particular data center as their primary data center, and upon a failure event at another data center, the same set of shared resources of the particular data center provides virtual computer services to those enterprise customers assigned to the particular data center as their primary data center and to those enterprise customers assigned to the other data center as their primary data center who are also assigned to the particular data center as their secondary data center, such that each particular data center does not include substantial shared resources dedicated to secondary services which remain idle in the absence of a failure event.

11. The system of claim 7, wherein each of the plurality of physical locations has substantially less than 100% reserve capacity for disaster recovery.

12. The system of claim 11 wherein for N physical locations, each having approximately X capacity for primary computing services, each of the physical locations is provisioned with approximately $X/(N-1)$ additional reserve capacity for disaster recovery.

13. The system of claim 11 wherein the total amount of reserve capacity provided for disaster recovery is approximately the same as or less than the capacity for primary computing services provided by the physical location that has the largest capacity for primary computing services.

14. The system of claim 11, wherein every enterprise customer has a contracted level of disaster recovery service performance that is less than or equal to the enterprise customer's regular contracted level of service performance, and wherein for every set of enterprise customers having a common primary and a common secondary physical location, the common secondary location has sufficient reserve capacity to provide the contracted level of disaster recovery service performance for each enterprise customer in the set of enterprise customers.

15. The system of claim 7, wherein each data center has a capacity sufficient to at least meet a minimum primary service level of all primary customers and a minimum secondary service level of all secondary customers, and wherein capacity used to meet the minimum secondary service level of all secondary customers is at least partially used to improve primary services to the primary customers.

16. The system of claim 7, further comprising:

a configuration replication engine configured to copy configuration data changes for computing service made for an enterprise customer at the enterprise customer's primary data center to the secondary data center.

17. The system of claim 16, wherein physical databases for an enterprise customer located at the primary data center are mirrored at the secondary data center.

18. The system of claim 17, wherein transaction data stored in the physical databases is mirrored synchronously at the secondary location.

19. The system of claim 7, wherein the computing services include application services, wherein the application services include one or more of online transaction processing, online analytics, and software as a service.

20. The system of claim 7, wherein the computing services are provided by systems including one or more of client-server systems, web servers, 2-tiered web servers, 3-tiered web servers, and n-tiered web servers.

21. The system of claim 7, wherein the computing services include IT infrastructure management services, including one or more of storage management, LAN management, computing management, and security management.

22. The system of claim 7, further comprising:
a data network connecting the plurality of physical locations and configured to transfer the configuration data and the transaction data between the plurality of physical locations.

23. The system of claim 22, wherein the data network is configured to provide guaranteed quality of service levels.

24. The system of claim 22, wherein the data network is configured to provide Managed OSI Layer 2 connections between locations.

25. The system of claim 7, wherein replication of configuration data and mirroring of transaction data is provided at a lower guaranteed quality of service level than normal traffic.

26. A method for allocating disaster recovery capabilities, for a plurality of computing services customers, among a plurality of physical locations, comprising:
maintaining a plurality of data centers at different physical locations, each having a plurality of hardware and software resources for providing both primary and secondary services;
for each respective customer:
assigning the respective customer to one of the data centers as a primary data center, the primary data center storing the respective customer's configuration and transaction data and providing computing services to the respective customer therefrom;
assigning the respective customer to one of the data centers as a secondary data center, which stores mirrored transaction data and replicated configuration data from which to provide computing services for the respective customer in response to a failure event at the customer's primary data center;
providing computing services to the enterprise customers based on each customer's configuration and transaction data; and
wherein, for each data center, the customers assigned to the respective data center as a primary data center each have a secondary data center assignment at another data center, wherein the secondary data center assignments are distributed across the remaining data centers.

27. The method of claim 26, wherein the second assigning is based on which data center has the least number of enterprise customers receiving disaster recovery services at the data center.

28. The method of claim 26, wherein the second assigning is based on which data center has the least number of enterprise customers receiving services at the location.

29. The method of claim 26, wherein the second assigning is based on which data center has the least number of enterprise customers receiving disaster recovery services and able to meet the service levels contracted for by the enterprise customer.

30. The method of claim 26, wherein the second assigning is based on which data center has the least number of enterprise customers receiving disaster recovery services and located beyond a geographical threshold from the primary location.

* * * * *